(12) United States Patent
Lee (10) Patent No.: US 9,465,431 B2
(45) Date of Patent: Oct. 11, 2016

(54) POWER MANAGEMENT METHOD AND APPARATUS

(75) Inventor: Je-hwan Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 282 days.

(21) Appl. No.: 13/241,840

(22) Filed: Sep. 23, 2011

(65) Prior Publication Data

US 2012/0084584 A1    Apr. 5, 2012

(30) Foreign Application Priority Data

Sep. 30, 2010  (KR) .......................... 10-2010-95395

(51) Int. Cl.
*G06F 1/32*    (2006.01)

(52) U.S. Cl.
CPC .......... *G06F 1/3287* (2013.01); *Y02B 60/1282* (2013.01)

(58) Field of Classification Search
USPC ....... 713/300, 310, 320, 321, 322, 323, 324, 713/330, 340, 375, 1, 2, 100
See application file for complete search history.

(56) References Cited

U.S. PATENT DOCUMENTS

| | | | | |
|---|---|---|---|---|
| 4,293,927 A | * | 10/1981 | Hoshii .......................... | 713/322 |
| 4,903,222 A | * | 2/1990 | Carter et al. ............. | 361/679.12 |
| 5,017,856 A | * | 5/1991 | Johnson, Jr. ................ | 320/106 |
| 6,058,030 A | * | 5/2000 | Hawkes et al. ............... | 363/65 |
| 6,064,187 A | * | 5/2000 | Redl et al. .................... | 323/285 |
| 2002/0023235 A1 | * | 2/2002 | Odaohhara ................... | 713/320 |
| 2003/0126480 A1 | * | 7/2003 | Song ............................. | 713/300 |
| 2005/0052159 A1 | * | 3/2005 | Moore et al. ................ | 320/134 |
| 2006/0146467 A1 | | 7/2006 | Ruan et al. | |
| 2007/0108293 A1 | | 5/2007 | Odate et al. | |
| 2007/0145962 A1 | * | 6/2007 | Huang et al. ................ | 323/283 |
| 2007/0220290 A1 | * | 9/2007 | Tsai ....................... | G06F 1/266 |
| | | | | 713/300 |
| 2008/0148082 A1 | * | 6/2008 | Shen et al. ................... | 713/320 |
| 2008/0191665 A1 | * | 8/2008 | Shao-Tsu et al. ............ | 320/141 |

FOREIGN PATENT DOCUMENTS

| | | |
|---|---|---|
| JP | 2000-299978 | 10/2000 |
| JP | 2002-62952 | 2/2002 |

OTHER PUBLICATIONS

European Search Report Issued on Feb. 1, 2012 in EP Patent Application No. 11182596.4.
Korean Patent Office Action issued in Korean Patent Application No. 10-2010-0095395 dated Jun. 21, 2016 (total number of pp. 11).

* cited by examiner

*Primary Examiner* — Kim Huynh
*Assistant Examiner* — Paul J Yen
(74) *Attorney, Agent, or Firm* — Staas & Halsey LLP (57) ABSTRACT

A power management method in a user terminal receives a power from a power supply unit to charge a system voltage, compares the system voltage with a preset voltage, and controls a power input from the power supply unit according to the comparison result.

25 Claims, 6 Drawing Sheets

POWER MANAGEMENT METHOD AND APPARATUS

CROSS-REFERENCE TO RELATED APPLICATIONS

This application claims the benefit of priority to Korean Patent Application No. 10-2010-0095395, filed on Sep. 30, 2010, in the Korean Intellectual Property Office, the disclosure of which is incorporated herein in its entirety by reference.

BACKGROUND

1. Field of the Invention

The present general inventive concept relates to a power management method and apparatus, and more particularly, to a power management method and apparatus that is capable of reducing standby power by to control power supply from a power supply unit when a user terminal is in a system-off status.

2. Description of the Related Art

A computer generally blocks or reduces power supply to most modules in a computer system in order to reduce power consumption of the computer system when the computer does not perform operations.

However, even when the computer system is in a maximum power save mode or a soft-off status, a microcomputer (Micom) needs to operate, and thus, the computer receives power from the power supply unit in order to operate the Micom. When it is assumed that the power supplied from the power supply unit to the computer is Vps, electric current consumed by the Micom is Imicom, and a driving voltage of the Micom is Vmicom, and power loss in the computer in the system-off status is (Vps−Vmicom)*Imicom.

In general, a computer, such as a mobile personal computer (PC), receives power of a high voltage of about 16 to about 19 V from the power supply unit while the Micom driving voltage in the mobile PC is about 3.3V or less, and thus, unnecessary power loss occurs in the computer that is in the system-off status.

SUMMARY

The present general inventive concept provides a power management method and apparatus capable of reducing standby power by to control power input from a power supply unit.

Additional aspects and utilities of the present general inventive concept will be set forth in part in the description which follows and, in part, will be obvious from the description, or may be learned by practice of the present general inventive concept.

Features and/or utilities of the present general inventive concept may be realized by a power management method in a user terminal, the method including the operations of receiving a power from a power supply unit to charge a system voltage, comparing the system voltage with a preset voltage, and controlling a power input from the power supply unit according to the comparison result.

The system voltage may be a voltage across a capacitor charged with the power supplied from the power supply unit.

The user terminal may include a switch connected to the power supply unit, and the operation of to control the power input from the power supply unit may include the operations of receiving the power from the power supply unit by turning on the switch when the system voltage is equal to or less than a first preset voltage and blocking the power supply from the power supply unit by turning off the switch when the system voltage is equal to or greater than a second preset voltage.

The method may further include the operation of transforming the system voltage to supply the voltage to a microcomputer (Micom), wherein the first preset voltage may be equal to or greater than the voltage supplied to the Micom, and the second preset voltage may be equal to or greater than the voltage supplied from the power supply unit.

The method may further include the operation of determining whether the user terminal is in a system-off status, and the operation of comparing the system voltage with the preset voltage may include the operation of comparing the system voltage with the preset voltage when the user terminal is in the system-off status.

The system-off status may be one of an S4 mode and an S5 mode according to an ACPI specification.

The method may further include the operation of determining whether a charge amount of a battery mounted in a battery pack is equal to or greater than a predetermined reference value when the user terminal is in the system-off status, and the operation of comparing of the system voltage with the preset voltage may include the operation of comparing the system voltage with the preset voltage when the user terminal is in the system-off status and the charge amount of the battery is equal to or greater than the predetermined reference value.

The method may further include the operation of receiving the power from the power supply unit by turning on the switch when the user terminal is not in the system-off status or the charge amount of the battery is less than the predetermined reference value.

The method may further include the operation of receiving a system voltage control command from a user when the user terminal is in the system-off status, and the operation of comparing of the system voltage with the preset voltage may include the operation of comparing the system voltage with the preset voltage according to the power control command.

Features and/or utilities of the present general inventive concept may also be realized by a user terminal including a charging unit to receive a power from a power supply unit to charge a system voltage, a comparator to compare the system voltage with a preset voltage and to control the power input from the power supply unit according to the comparison result, and a microcomputer (Micom) to drive the comparator.

Features and/or utilities of the present general inventive concept may also be realized by a user terminal including a charging unit to receive power from a power supply unit to charge a system voltage and a microcomputer (Micom) to compare the system voltage with a preset voltage and to control power input from the power supply unit according to the comparison result.

Features and/or utilities of the present general inventive concept may also be realized by a computer readable recording medium having embodied thereon a computer program to execute a power management method including the operations of receiving a power from a power supply unit to charge a system voltage, comparing the system voltage with a preset voltage, and controlling a power input from the power supply unit according to the comparison result.

Features and/or utilities of the present general inventive concept may also be realized by an electronic device including a charging unit to receive power from a power supply and to generate a system voltage to power at least one electronic component of the electronic device, and a comparator to compare the system voltage to a predetermined voltage, and to control power to the charging unit based on the comparison.

The comparator may be a hysteresis comparator.

The electronic device may include a first switch between the power supply and the charging unit. The comparator may turn off power to the charging unit by opening the first switch when the system voltage is above a first predetermined level, and the comparator may turn on power to the charging unit by closing the first switch when the system voltage is below a second predetermined level.

The electronic device may further include a microcomputer (Micom) to receive the system voltage and to control the supply of power to the comparator.

The electronic device may further include a regulator to receive the system voltage and to output a regulated voltage to drive the Micom and the comparator, and a second switch located between the regulator and the comparator. The Micom may determine whether the electronic device is in a low-power state and may supply power to the comparator by closing the second switch when the electronic device is in the low-power state and may stop power to the comparator by opening the second switch when the electronic device is not in the low-power state.

The electronic device may further include a plurality of DC/DC converters to receive the system voltage and to supply power to a respective plurality of electronic components, and the Micom may control the operation of the plurality of DC/DC converters.

The electronic device may further include a battery connected to the charging unit, and a third switch located between the power supply and the battery. The Micom may control a battery charging unit to charge the battery when a charge of the battery is below a predetermined level. The Micom may close the third switch to provide power from the battery to the charging unit when the electronic device does not receive power from the power supply, and the Micom may open the third switch to stop power from the battery to the charging unit when the electronic device receives power from the power supply.

Features and/or utilities of the present general inventive concept may also be realized by a method of controlling an electronic device, the method including generating a system voltage by charging a charging unit with power from a power supply, comparing the system voltage to a predetermined voltage, and controlling the supply of power from the power supply to the charging unit according to the results of the comparison.

The comparison may include comparing the system voltage to first and second predetermined voltages, and controlling the supply of power to the charging unit includes stopping the supply of power to the charging unit when the system voltage is greater than the first predetermined voltage and supplying power to the charging unit when the system voltage is less than the second predetermined voltage.

The method may further include determining whether the electronic device is in a low-power state, and performing the comparison of the system voltage to the predetermined voltage only when the electronic device is in the low-power state.

The method may further include providing power from a battery when the electronic device does not receive power from the power supply, and stopping power from the battery from being supplied when the device does receive power from the power supply.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
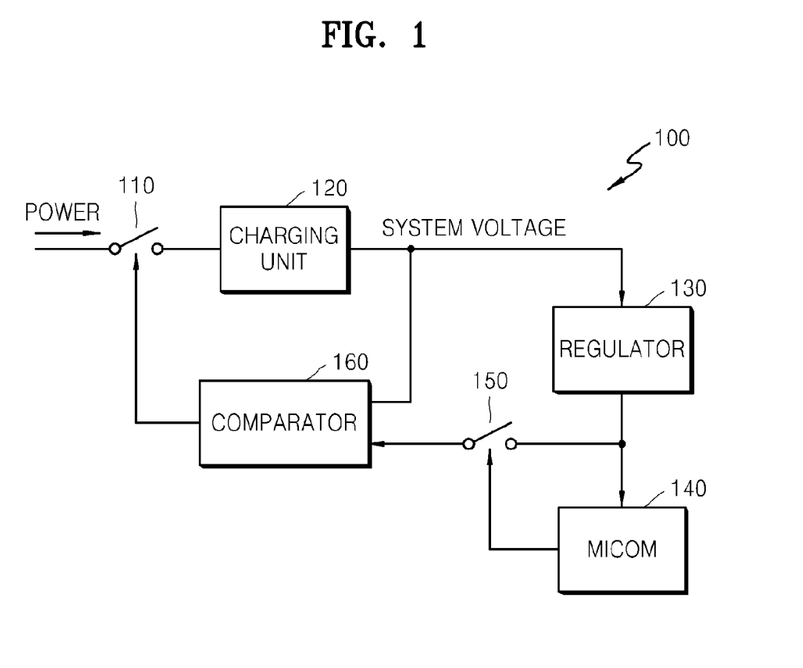
FIG. 1 is a block diagram of a user terminal according to an embodiment of the present general inventive concept.

FIG. 1 is a block diagram of a user terminal 100 according to an embodiment of the present general inventive concept.

The user terminal 100 is a computer driven by an operating system, for example, a portable computer such as a laptop, an ultra mobile PC (UMPC), or a desk top computer. Alternatively, the user terminal 100 may be any device that receives power from an external source and supplies power to a plurality of devices, such as a CPU, memory, and other circuitry. For example, the user terminal 100 may further include a printing device, personal electronic device, or other image forming device.

Referring to FIG. 1, the user terminal 100 includes a first switch 110, a charging unit 120, a regulator 130, a microcomputer (Micom) 140, a second switch 150, and a comparator 160.

The first switch 110 is located between an external power supply unit (not shown) and the user terminal 100 so as to supply power from the power supply unit to the user terminal 100 or block the power supply according to control of the comparator 160. The power supply unit may be connected to a power outlet, may be an external battery, generator, or other power supply unit.

The charging unit 120 receives the power from the power supply unit to generate electric charges. The charging unit 120 may be a capacitor, for example, and when the charging unit 120 is the capacitor, the voltage across the capacitor becomes a system voltage.

The regulator 130 receives the power from the charging unit 120 and outputs a constant voltage. The regulator 130 may be, for example, a linear regulator, a switching regulator, or a positive voltage regulator. The regulator 130 receives the system voltage, and outputs to the Micom 140 a Micom driving voltage to drive the Micom 140.

The Micom 140 is driven by the Micom driving voltage received from the regulator 130. The Micom 140 determines whether the user terminal 100 is in a system-off status. The Micom 140 may include, for example, at least one processor, supporting logic, and other circuitry to control functional units of the user terminal 100.

In embodiments of the present general inventive concept, the system-off status refers to an S4 status of the advanced configuration and power interface (ACPI) specification, that is, a maximum power-save mode status, or an S5 status, that is, a soft-off status. In other words, in the present specification and claims, a system-off status may refer to each of a maximum power-save mode and a soft-off. Likewise, a low-power state may refer to each of a power-save mode and a soft-off status. A soft-off status is a status in which operation systems of a device are turned off, but power is still supplied to the device. The power may maintain one or more components running, such as memory, so that when the device is turned on, the data of the memory is not lost. In contrast, a hard-off status is one in which power is not supplied to a device. For example, a physical switch may prevent power from reaching electrical components within the device, or a plug may not be connected to a power source.

When the Micom 140 determines that the user terminal 100 is in the S4 status or an S5 status, the Micom 140 controls the second switch 150 to close the second switch 150, and then the comparator 160 operates.

The second switch 150 is located between the regulator 130 and the comparator 160, and is opened/closed by the control of the Micom 140. When the second switch 150 is closed, the power from the regulator 130 is input to the comparator 160 so that the comparator 160 operates. Conversely, when the second switch 150 is opened, the power supply to the comparator 160 is blocked and the comparator 160 does not operate.

The comparator 160 receives the power from the regulator 130 by the control of the Micom 140 to operate. According to one embodiment, the comparator 160 may be a Schmitt trigger having a hysteresis characteristic.

A voltage is preset in the comparator 160. The comparator 160 may include memory to store a value corresponding to the preset voltage, or may have one or more physical characteristics, such as a predetermined resistance value or chemical composition, that indicates the preset voltage. The preset voltage may be set when the comparator 160 is manufactured, or alternatively, may be set by a user to operate the comparator 160. The comparator 160 receives the system voltage and compares the system voltage with the preset voltage to output a control signal according to the comparison result to the first switch 110.

When the system voltage is equal to or less than a first voltage (low voltage, VL) that is preset in the comparator 160, the comparator 160 outputs to the first switch 110 a control signal to close the first switch 110. In addition, when the system voltage is equal to or greater than a second voltage (high voltage, VH) (VH>VL) that is preset, the comparator 160 outputs a control signal to the first switch 110 to open the first switch 110.

The low voltage VL may be equal to or greater than the Micom driving voltage, and the high voltage VH may be equal to or less than the power supplied from the power supply unit. Thus, in the system-off status, the power of a voltage that is equal to or greater than the Micom driving voltage and equal to or less than the power supplied from the power supply unit may be input to the user terminal 100. Similarly, the low voltage VL may be a predetermined level above the Micom driving voltage, such as 5% above the Micom driving voltage, to ensure that power to the Micom is not stopped.

As described above, in the system-off status, the user terminal 100 controls the connection to the power supply unit through the comparator 160, and thus, reduces power loss.

Figure 2:
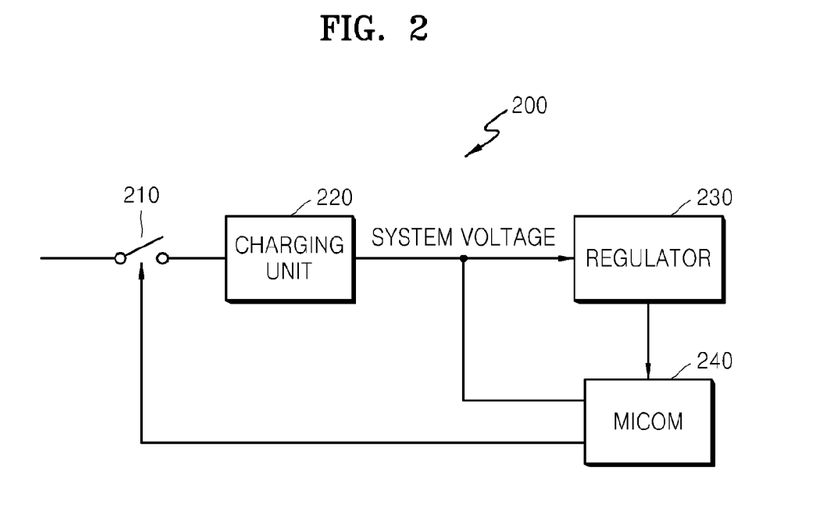
FIG. 2 is an internal block diagram of a user terminal according to another embodiment of the present general inventive concept.

FIG. 2 is an internal block diagram of a user terminal 200 according to another embodiment of the present general inventive concept. Referring to FIG. 2, the user terminal 200 includes a first switch 210, a charging unit 220, a regulator 230, and a Micom 240.

The first switch 210, the charging unit 220, and the regulator 230 of the user terminal 200 respectively perform the same functions as those of the first switch 110, the charging unit 120, and the regulator 130 of the user terminal 100 shown in FIG. 1, and thus, detailed descriptions about these elements are not provided here.

The first switch 210 controls the power to be supplied to the user terminal 100 from the power supply unit or blocks the power supply.

The charging unit 220 receives the power to be charged from the power supply unit.

The regulator 230 receives the system voltage, and outputs the Micom driving voltage to the Micom 240.

The Micom 240 receives the Micom driving voltage from the regulator 230 to operate. The Micom 240 determines whether the user terminal 200 is in the system-off status. When it is determined that the user terminal 200 is in the system-off status, the Micom 240 compares the system voltage with a preset voltage.

The user terminal 200 of FIG. 2 is different from the user terminal 100 shown in FIG. 1 in that the Micom 240, and not a comparator 160, compares the system voltage with the preset voltage and controls the power input from the power supply unit according to the comparison result.

When the system voltage is equal to or less than a first voltage, that is, a low voltage VL that is preset, the Micom 240 outputs a control signal to close the first switch 210. In addition, when the system voltage is equal to or greater than a second voltage, that is, a high voltage VH (VH>VL) that is preset, the Micom 240 outputs a control signal to open the first switch 210.

According to the present embodiment, in the system-off status of the user terminal 200, the user terminal 200 controls the connection to the power supply unit through the Micom 240 in order to reduce power loss.

Figure 3:
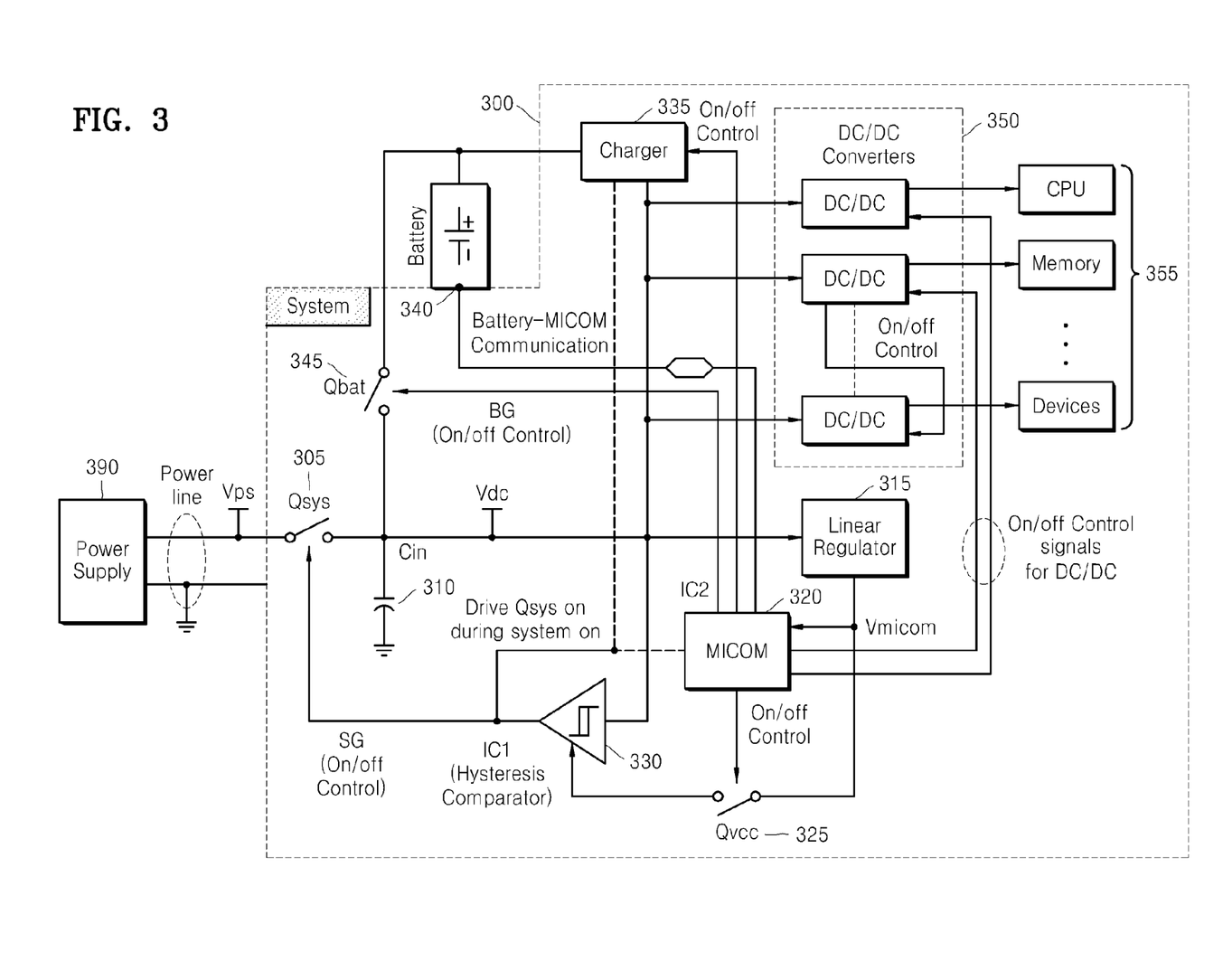
FIG. 3 is a detailed block diagram of a user terminal that is modified example of the user terminal shown in FIG. 1.

FIG. 3 is a block diagram of a user terminal 300 that is a modified example of the user terminal 100 shown in FIG. 1.

The user terminal 300 may include a first switch Qsys 305, a capacitor Cin 310, a linear regulator 315, a Micom 320, a second switch Qvcc 325, a hysteresis comparator 330, a charger 335, a battery pack 340, a third switch Qbat 345, direct current (DC)/DC converters 350, and a plurality of functional units 355.

Hereinafter, operations of the user terminal 300 in a system operating status and in a system-off status will be described as follows.

When the system operates, the first switch Qsys 305 is in a turn-on status. The first switch Qsys 305 is connected in series to a power line from the power supply unit 390 to the user terminal 300 so as to supply the power Vps to the system.

When the system operates, the first switch Qsys 305 may be in a turn-on status by control of the Micom 320 or the charger 335, or may be in a turn-on status by self-bias.

When the first switch Qsys 305 is in a turn-on status, the capacitor Cin 310 receives the power Vps from the power supply unit 390 to charge the system voltage Vdc and maintains the charged voltage. Voltage of across the charged capacitor Cin 310 is the system voltage Vdc for supplying the power to the user terminal 300.

The linear regulator 315 receives the system voltage Vdc, and transforms the system voltage to output a Micom driving voltage Vmicom that is necessary to drive the Micom 320.

The Micom 320 operates upon receiving the Micom driving voltage Vmicom from the linear regulator 315. The Micom 320 controls overall operations of the user terminal 300. The Micom I320 transmits an on/off control signal to the DC/DC converters 350 to control the DC/DC converters 350 to operate.

The DC/DC converters 350 convert the system voltage Vdc on receiving the control signal from the Micom 320 to supply the power to the plurality of functional units 355 which may include, for example, a central processing unit (CPU), memory, and other devices. The DC/DC converters 350 may be turned on/turned off by the Micom 320, interaction between the DC/DC converters 350, or the plurality of functional units 355.

When a battery is mounted in the battery pack 340, the Micom 320 performs a bi-directional communication with the battery pack 340 through a system management bus (SMBUS). The Micom 320 checks information such as a charge amount of the battery, charging/discharging voltages, charging/discharging currents, and temperature through the communication with the battery pack 340.

When the charge amount of the battery is equal to or less than a predetermined reference value, the Micom 320 turns on the charger 335 to charge the battery. The charger 335 operates according to the control of the Micom 320 so as to charge the battery by converting the system voltage Vdc.

The Micom 320 controls the third switch Qbat 345 to be turned off while the power supply unit 390 is connected thereto. The third switch Qbat 345 is controlled by the Micom 320 to block the battery power to be supplied to the system while the power is supplied from the power supply unit 390.

In addition, the Micom 320 turns off the second switch Qvcc 325 to block the power supply to the hysteresis comparator 330 while the power supply unit 390 is connected thereto.

Next, operations of the user terminal 300 in the system-off status will be described as follows.

The Micom 320 determines whether the system is in a working status, in a sleeping mode, a soft-off status, or a mechanical-off status.

When the system is turned off and the system is in the S4 status (maximum power-save mode) or the S5 status (soft-off status) of the ACM specification, the Micom 320 transmits an off-control signal to the DC/DC converters 350 so that the DC/DC converters 350 do not supply the power to the plurality of functional units 355.

When it is determined that the system is turned off, the Micom 320 controls the second switch Qvcc 325 to be turned on. The second switch Qvcc 325 is located between the linear regulator 315 and the hysteresis comparator 330, and is turned on/turned off according to the control of the Micom 320. The hysteresis comparator 330 is activated by receiving the power from the linear regulator 315 when the second switch Qvcc 325 is turned on.

In another embodiment of the present general inventive concept, when it is determined that the system is turned off, the Micom 320 may check the charge status of the battery before controlling the second switch Qvcc 325 to be turned on. Thus, unless the charge amount of the battery is equal to or greater than a predetermined reference value, the charging of the battery may be performed by receiving the power from the power supply unit 390.

The Micom 320 checks the charge status of the battery through the communication with the battery pack 340. Then, unless the charge amount of the battery is equal to or greater than a predetermined reference value, the Micom 320 may turn on the charger 335 so as to charge the battery. At this time, the Micom 320 turns off the third switch Qbat 345 so as to block the power supply from the battery to the system.

After charging the battery to the predetermined reference value or greater, the Micom 320 turns on the second switch Qvcc 325 to activate the hysteresis comparator 330.

In another embodiment of the present general inventive concept, when the user requests the Micom 320 to stop the charging of the battery even though the charge amount of the battery is less than the predetermined reference value, the Micom 320 stops charging the battery and turns on the second switch Qvcc 325 to supply the power to the hysteresis comparator 330.

The hysteresis comparator 330 receives the system voltage Vdc with a hysteresis setting between a high reference voltage VH and a low reference voltage VL.

The hysteresis comparator 330 compares the system voltage Vdc with the preset low voltage VL and the high voltage VH. The hysteresis comparator 330 controls the first switch Qsys 305 to be closed when the system voltage Vdc is equal to or less than the low voltage VL so that the user terminal 300 receives the power from the power supply unit.

The low voltage VL may be equal to or greater than the Micom driving voltage Vmicom. Because the Micom 320 continuously operates while in the system-off status, the voltage that is equal to or greater than the Micom driving voltage Vmicom may be supplied to the system from the power supply unit 390.

The Micom 320 controls the third switch Qbat 345 to be turned off while the power is supplied from the power supply unit to the Micom 320.

The hysteresis comparator 330 controls the first switch Qsys 305 to be opened when the system voltage Vdc is equal to or greater than the high voltage VH, so that the power supply unit 390 may not supply the power to the user terminal 300. Here, the Micom 320 turns off the third switch Qbat 345 so as to block the power supply from the battery to the system.

In the present embodiment, the high voltage VH may be equal to or less than the voltage Vps of the power supplied from the power supply unit in order to block unnecessary power supply from the power supply unit while the system-off status and to reduce the power loss.

As described above, when it is determined that the system is turned off, the Micom 320 activates the hysteresis comparator 330 so that the hysteresis comparator 330 compares the preset voltage with the system voltage and controls the power supply from the power supply unit.

Figure 4:
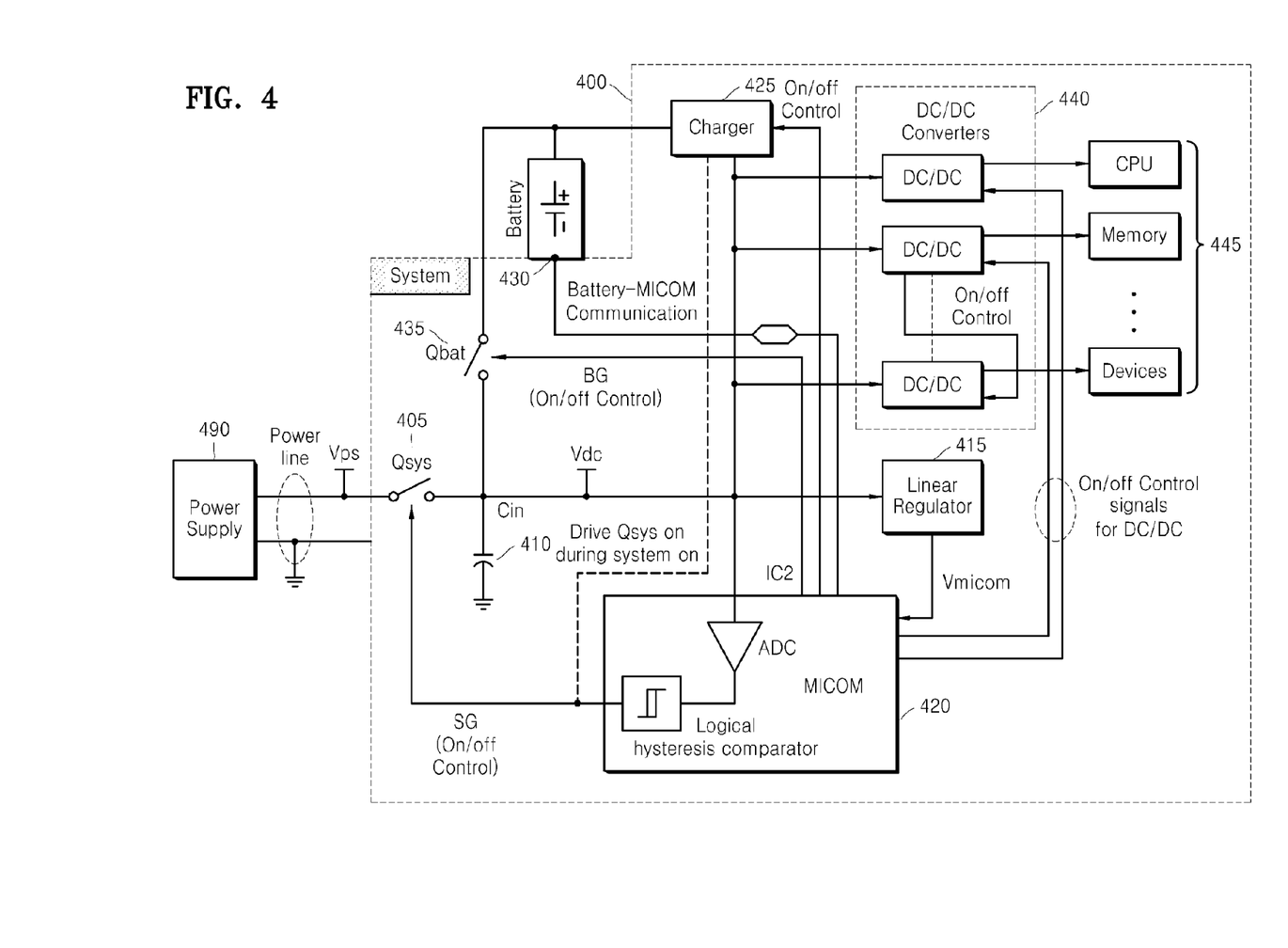
FIG. 4 is a detailed block diagram of a user terminal that is modified example of the user terminal shown in FIG. 2.

FIG. 4 is a block diagram of a user terminal 400 that is a modified example of the user terminal 200 shown in FIG. 2. The user terminal 400 includes a first switch Qsys 405, a capacitor Cin 410, a linear regulator 415, a Micom 420, a charger 425, a battery pack 430, a second switch Qbat 435, DC/DC converters 440, and a plurality of functional units 445.

The first switch Qsys 405, the capacitor Cin 410, the linear regulator 415, the charger 425, the battery pack 430, the second switch Qbat 435, the DC/DC converters 440, and the plurality of functional units 445 respectively perform the same functions as those of the first switch Qsys 305, the capacitor Cin 310, the linear regulator 315, the charger 335, the battery pack 340, the third switch Qbat 345, the DC/DC converters 350, and the plurality of functional units 355 of the user terminal 300 shown in FIG. 3. Thus, detailed descriptions of these components are not provided here.

The linear regulator 415 receives the system voltage Vdc, and outputs the Micom driving voltage Vmicom to the Micom 420. The Micom 420 operates on receiving the Micom driving voltage Vmicom from the linear regulator 415.

The Micom 420 controls overall operations of the user terminal 400. When the Micom 420 determines that the system is in a turned off status, the Micom 420 compares the system voltage with a preset voltage and controls the power input from the power supply unit 490 according to the comparison result.

The user terminal 400 of FIG. 4 does not include the hysteresis comparator 330, unlike the user terminal 300 of FIG. 3. Instead, the Micom 420 includes an analog/digital (AD) converter therein so that the Micom 420 receives the system voltage Vdc through an AD converter port and compares the input voltage with the preset voltage by using a hysteresis comparator software programmed therein. The Micom 420 controls the first switch Qsys 435 to be turned on when the system voltage Vdc is equal to or less than the low voltage VL, so that the power Vps may be supplied to the user terminal 400 from the power supply unit 490.

The Micom 420 controls the first switch Qsys 435 to be turned off when the system voltage Vdc is equal to or greater than the high voltage VH, so that the power supply unit 490 does not supply the power.

According to the above embodiments of the present general inventive concept, when it is determined that the system is turned off, the Micom may compare the preset voltage and the system voltage so as to control the power supply from the power supply unit 490.

Figure 5A:
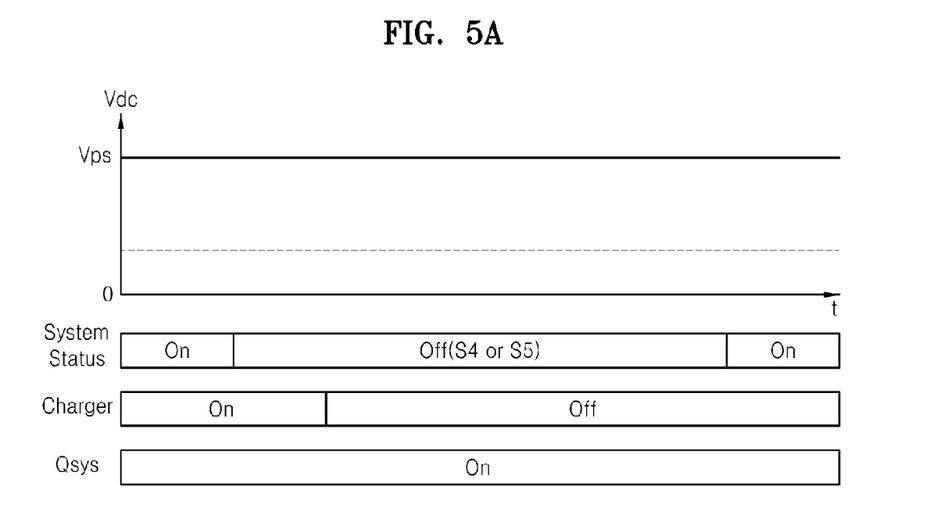
FIG. 5 is a graph comparing a system voltage in a system-off status before and after applying the embodiment of the present general inventive concept.
Figure 5B:
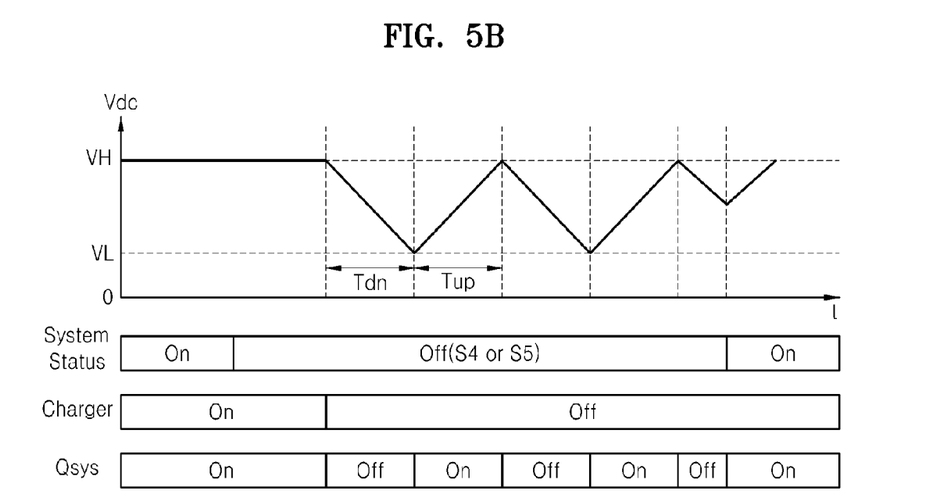

FIGS. 5A and 5B are graphs showing the system voltages Vdc before and after applying the present embodiment to the power management.

FIG. 5A is a graph showing the system voltage Vdc before applying the present embodiment, that is, before to control the power supply in the system-off status.

Referring to FIG. 5A, a switch Qsys that is located between the power supply unit and a user terminal is always in a turn-on status without regard to the system status of the user terminal or the charge amount of a battery mounted in the user terminal, which means that constant power is continuously supplied to the user terminal from the power supply unit without regard to an operating status of a system. In this case, as shown in the graph, the system voltage Vdc is the same as the power Vps supplied from the power supply unit.

In FIG. 5A, when the system is in a turned-off status and the battery is not in the charging status, the Micom only consumes the power in the system, and thus, power loss (P, loss) in the system may be calculated as the following Equation 1, $$P, loss = (Vps - Vmicom) * Imicom \quad (1)$$

where, Vps denotes the voltage of the power supplied from the power supply unit, Vmicom denotes the Micom driving voltage, and Imicom denotes electric current consumed by the Micom.

FIG. 5B is a graph showing the system voltage Vdc when the power supply is controlled in the system-off status according to an embodiment of the present general inventive concept.

Referring to FIG. 5B, when the system status of the user terminal is in a turn-on status and the battery is charging, the user terminal controls a switch Qsys located between the power supply unit and the user terminal to be turned on so as to receive the power Vps from the power supply unit.

In FIG. 5B, it is assumed that the high voltage preset in the hysteresis comparator is equal to the voltage Vps of the power supplied from the power supply unit. In this case, as shown in FIG. 5B, when the system is in the operating status and the battery is charging, the voltage Vdc has the value of VH.

When the system status is in the turnoff status, the user terminal may determine whether the battery is in the charging status according to the embodiment of the present general inventive concept. When the battery is in the charging status, the user terminal controls the switch Qsys to be turned on so that the power Vps may be supplied to the user terminal from the power supply unit.

When the system status is in the turnoff status and the battery is not in the charging status, the user terminal compares the system voltage Vdc with the preset voltages VH and VL according to the embodiment of the present general inventive concept. When the system voltage Vdc is equal to or greater than the voltage VH, that is, at the point where a section Tdn starts in FIG. 5B, the user terminal controls the switch Qsys to be turned off so that the power is not supplied from the power supply unit to the user terminal.

Since the power is not supplied from the power supply unit, the system voltage of the user terminal is reduced. Since the system voltage is the voltage across the capacitor that stores the power supplied from the power supply unit, the system voltage is reduced exponentially when electric charges are discharged because the power is not supplied from the power supply unit, and is increased exponentially when the power is supplied from the power supply unit. However, for convenience of description, the system voltage Vdc is denoted as being linearly reduced or linearly increased in FIG. 5B.

When the system status is in the turn-off status and the battery is not in the charging status, the user compares the system voltage Vdc with the voltages VH and VL at regular time intervals, random time intervals, or continuously. When the system voltage Vdc is equal to or less than the voltage VL, that is, at a point where a section Tup starts in the graph of FIG. 5B, the user terminal controls the switch Qsys to be turned on so that the power is supplied from the power supply unit to the user terminal again.

In the embodiment of the present general inventive concept, the voltage VL is equal to or greater than the Micom driving voltage Vmicom.

When the power is supplied from the power supply unit, the system voltage Vdc of the user terminal is increased exponentially.

When the system is in the turn-off status and the battery is not in the charging status, the Micom only consumes the power in the system. At this time, the power loss (Ploss, Tdn) in the section Tdn may be calculated as the following Equation 2.

$$Ploss, Tdn = [0.5*(VH-VL)+(VL-Vmicom)]*Imicom \quad (2)$$

The power loss (Ploss, Tup) of the system in the section Tup may be calculated as the following Equation 3.

$$Ploss, Tup = [0.5*(VH-VL)+(VL-Vmicom)]*Imicom+0.5*Cin*(VH^2-VL^2) \quad (3)$$

In equation 3, $0.5*Cin*(VH^2-VL^2)$ denotes the power loss while charging the capacitor.

When it is assumed that the sum of the section Tdn and the section Tup is a period, the entire power loss (Ploss, Tdn+Tup) while one period may be calculated as the following Equation 4.

$$\text{Ploss, Tdn+Tup} = (\text{Ploss, Tdn} \cdot \text{Tdn} + \text{Ploss, Tup} \cdot \text{Tup})/(\text{Tdn+Tup}) \quad (4)$$

When comparing the power losses before and after applying the embodiment of the present general inventive concept, the reduced power loss while one period may be calculated as the following Equation 5.

$$(\text{Ploss, Tdn+Tup}) - (\text{P, loss}) = [0.5 \cdot (V_H - V_L) \cdot \text{Imicom} \cdot \text{Tdn} + \{0.5 \cdot (V_H - V_L) \cdot \text{Imicom} - 0.5 \cdot \text{Cin} \cdot (V_H^2 - V_L^2)\} \cdot \text{Tup}]/(\text{Tdn+Tup}) \quad (5)$$

In Equation 5, Tdn and Tup are 1. In addition, when it is assumed that VH=19 V, VL=4V, Vmicom=3.3V, Imicom=0.01A, and Cin=100 uF, the power loss in the conventional power management apparatus is 0.157 W according to Equation 1, and the power loss of the system according to the embodiment of the present general inventive concept is 0.082 W according to Equation 4. Thus, the difference between the power losses is 0.075 W, and thus, the power loss may be reduced by 47.7% when comparing with the conventional art.

Figure 6:
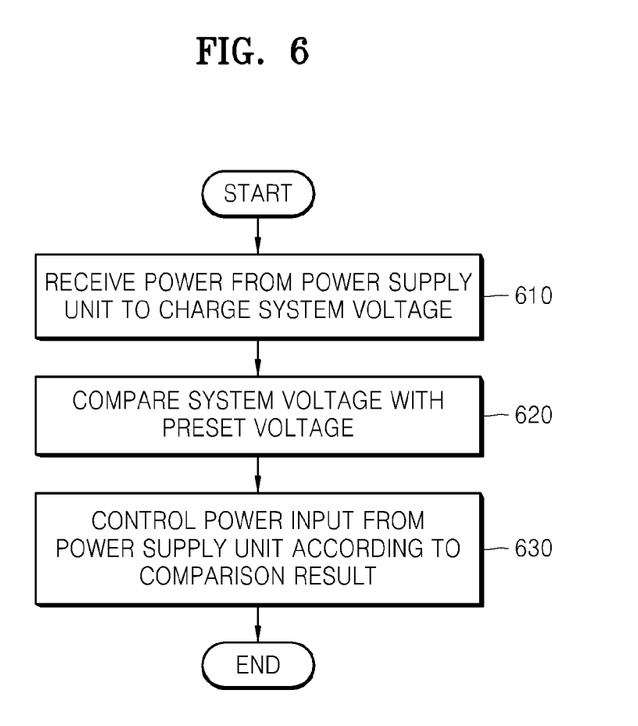
FIG. 6 is a flowchart illustrating a power management method according to an embodiment of the present general inventive concept.

FIG. 6 is a flowchart illustrating a power management method according to an embodiment of the present general inventive concept. Referring to FIG. 6, a user terminal receives a power from a power supply unit and charges a system voltage in operation 610. The user terminal uses the power supplied from the power supply unit as the system voltage.

The user terminal checks whether a system is in a turn-off status. When the system is in the turn-off status, the user terminal compares the system voltage with a preset voltage in operation 620.

The user terminal determines whether the system voltage is equal to or greater than a preset high voltage VH, or is equal to or less than a preset low voltage VL. In operation 630, the user terminal controls the power input from the power supply according to the determination. When the system voltage is equal to or greater than the voltage VH, the user terminal turns off a switch so as to block the power supply from the power supply unit. In addition, when the system voltage is equal to or less than the voltage VL, the user terminal turns on the switch so that the power may be supplied from the power supply unit.

Figure 7:
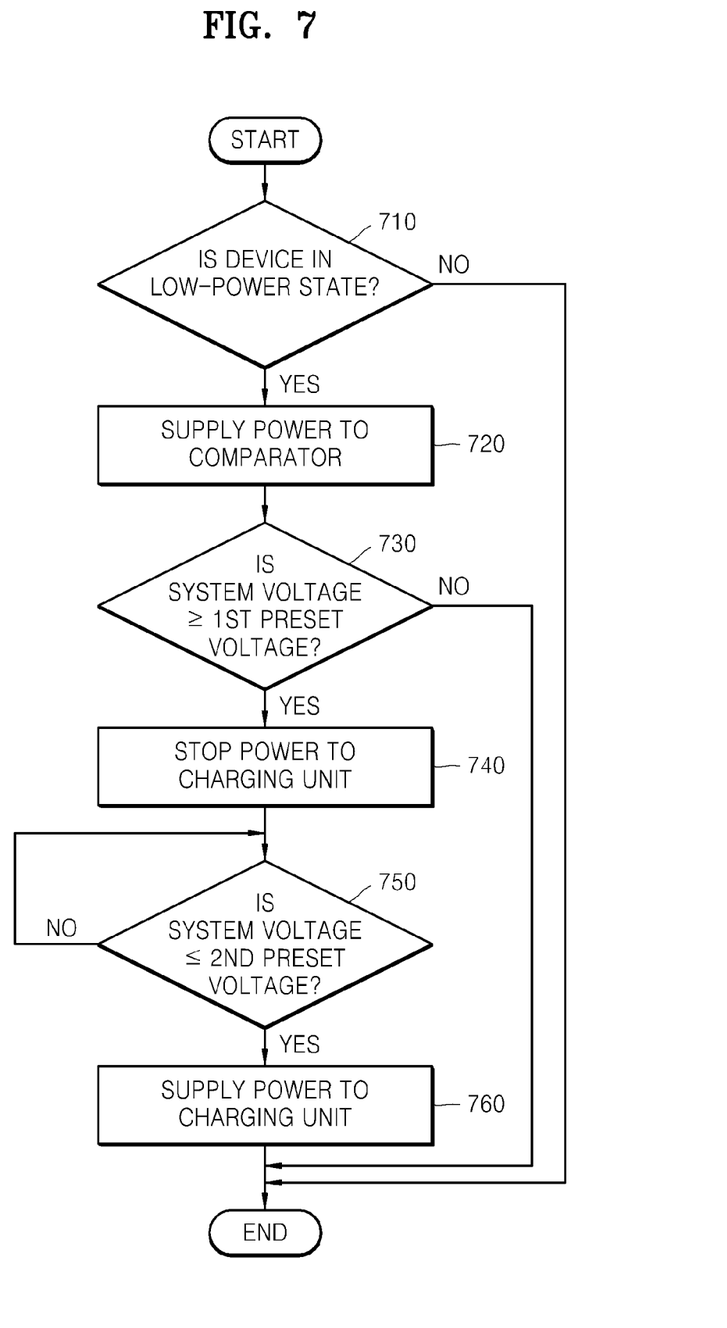
FIG. 7 is a flowchart illustrating a method of controlling power to an electronic device according to an embodiment of the present general inventive concept.

FIG. 7 illustrates a method of controlling an electronic device, such as the user terminals 100, 200, 300, and 400 of FIGS. 1-4, respectively, according to an embodiment of the present general inventive concept.

As the operation begins, it is assumed that power is supplied normally to a charging unit, such as the charging unit 120 of FIG. 1. In operation 710, it is determined whether the electronic device is in a low-power state. If not, the operation ends. If the electronic device is in the low-power state, then power is supplied to a comparator in operation 720. In operation 730, the comparator determines whether a system voltage is greater than or equal to a first preset voltage. If the system voltage is less than the first preset voltage, then the operation ends. For example, referring to FIG. 1, the first switch 110 may be closed to provide power to the charging unit 120. If the system voltage is greater than or equal to the first preset voltage, then the power to the charging unit is stopped in operation 740.

After the power to the charging unit is stopped, it may be determined in operation 750 whether the system voltage is less than or equal to a second preset voltage. When the system voltage reaches or falls below the second preset voltage, then the power may be supplied again to the charging unit in operation 760. Operations 720 to 760 may be repeated for as long as the electronic device is in the low-power state.

The present general inventive concept can also be embodied as computer-readable codes on a computer-readable medium. The computer-readable medium can include a computer-readable recording medium and a computer-readable transmission medium. The computer-readable recording medium may include any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium may transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A power management method in a user device, the user device comprising a single switch connected to a power supply unit, the method comprising:
   determining whether the user device is in a low power, power-on state and supplying power to the user device for a comparing operation if in the low power, power-on state;
   receiving power from the power supply unit at a charging unit to charge a system voltage;
   comparing the system voltage with a first preset voltage and a second preset voltage when the user device is in the lower power, power-on state;
   controlling the power from the power supply unit to the charging unit according to the comparison result by turning on the single switch when the system voltage is equal to or less than the first preset voltage;
   blocking the power from the power supply unit by turning off the single switch when the system voltage is equal to or greater than the second preset voltage; and
   receiving a system voltage control command from a user when the device is in the low power, power-on state,
   wherein the comparing the system voltage with the first preset voltage and the second preset voltage comprises comparing the system voltage with the first preset voltage and the second preset voltage according to the system voltage control command.

2. The method of claim 1, wherein the system voltage is a voltage across a capacitor charged with the power supplied from the power supply unit.

3. The method of claim 1, further comprising transforming the system voltage to supply the voltage to a microcomputer, wherein the first preset voltage is equal to or greater than the voltage supplied to the microcomputer, and the second preset voltage is equal to or greater than the voltage supplied from the power supply unit.

4. The method of claim 1, wherein the low power, power-on state is an S4 mode according to an ACPI specification.

5. The method of claim 1, further comprising determining whether a charge amount of a battery mounted in a battery pack is equal to or greater than a predetermined reference value, when the user device is in the low power, power-on state,
wherein the comparing of the system voltage with the first preset voltage and the second preset voltage comprises comparing the system voltage with the fist preset voltage and the second preset voltage when the user terminal is in the low power, power-on state and the charge amount of the battery is equal to or greater than the predetermined reference value.

6. The method of claim 5, further comprising receiving the power from the power supply unit by turning on the single switch when the user terminal is not in the low power, power-on state or the charge amount of the battery is less than the predetermined reference value.

7. A user terminal comprising:
a charging unit to receive power from a power supply unit to charge a system voltage to power at least one component of the user device when the user device is in a low power, power-on state;
a comparator to compare the system voltage with a preset voltage and to control the power from the power supply unit to the charging unit according to the comparison result;
a microcomputer to determine the user device is in the low power, power-on state and to drive the comparator when the user device is in the low power, power-on state;
a single switch connected to the power supply unit; and
a user interface to receive a system voltage control command from a user when the device is in the low power, power-on state,
wherein the microcomputer drives the comparator according to the system voltage control command, the comparator controls the power form the power supply unit to the charging unit according to the comparison result by turning on the single switch to receive the power from the power supply unit when the system voltage is equal to or less than a first preset voltage, and turning off the single switch to block the power from the power supply unit when the system voltage is equal to or greater than a second preset voltage.

8. The user device of claim 7, wherein the charging unit is a capacitor and the system voltage is a voltage across the capacitor.

9. The user device of claim 7, further comprising a regulator to receive the system voltage and to output a microcomputer driving voltage to drive the microcomputer,
wherein the first preset voltage is equal to or greater than the microcomputer driving voltage and the second preset voltage is equal to or less than the voltage of the power supplied from the power supply unit.

10. The user device of claim 7, wherein the low power, power-on state is an S4 mode according to an ACPI specification.

11. The user device of claim 7, wherein the microcomputer determines whether a charge amount of the battery mounted in the battery pack is equal to or greater than a predetermined reference value when the user device is in the low power, power-on state and drives the comparator when the charge amount of the battery is equal to or greater than the predetermined reference value.

12. The user device of claim 11, wherein the microcomputer controls the comparator to not receive power when the user device is not in the low power, power-on state or the battery charge amount is not equal to or greater than the predetermined reference value.

13. A user terminal comprising:
a charging unit to receive power from a power supply unit to charge a system voltage to power at least one component of the user device when the user device is in a low power, power-on state;
a microcomputer to compare the system voltage with a first preset voltage and a second preset voltage when the user device is in the low power, power-on state, and to control power input from the power supply unit to the charging unit according to the comparison result;
a single switch connected to the power supply unit; and
a user interface to receive a system voltage control command from a user when the device is in the low power, power-on state, wherein the microcomputer compares the system voltage with the first preset voltage and the second preset voltage according to the system voltage control command, and the microcomputer turns on the single switch to receive the power from the power supply unit when the system voltage is equal to or less than the first preset voltage, and turns off the single switch to block the power from the power supply unit when the system voltage is equal to or greater than the second preset voltage.

14. The user device of claim 13, further comprising a regulator to receive the system voltage and to output a microcomputer driving voltage to drive the microcomputer,
wherein the first preset voltage is equal to or greater than the voltage supplied to the microcomputer, and the second preset voltage is equal to or less than the voltage supplied from the power supply unit.

15. The user device of claim 14, wherein the microcomputer determines whether the user terminal is in a low power, power-on state and compares the system voltage with the first preset voltage and the second preset voltage when the user device is in the low power, power-on state.

16. The user device of claim 15, wherein the microcomputer determines whether a charge amount of a battery mounted in a battery pack is equal to or greater than a predetermined reference value when the user device is in the low power, power-on state, and compares the system voltage with the preset voltage when the charge amount of the battery is equal to or greater than the predetermined reference value.

17. A non-transitory computer readable recording medium having embodied thereon a computer program to execute a power management method, the method comprising:
receiving power from a power supply unit at a charging unit to charge a system voltage to power at least one electronic component when the user device is in a low power, power-on state;
receiving a system voltage control command from a user when the device is in the low power, power-on state;
comparing, according to the received system voltage control command, the system voltage with a first preset voltage and a second preset voltage when the user device is in the low power, power-on state;
controlling the power from the power supply unit to the charging unit according to the comparison result by receiving the power from the power supply unit when the system voltage is equal to or less than the first preset voltage; and blocking the power from the power supply unit with a single switch when the system voltage is equal to or greater than the second preset voltage.

18. An electronic device, comprising:

a charging unit to receive power from a power supply and to generate a system voltage to power at least one electronic component of the electronic device when the user device is in a low power, power-on state;

a comparator to compare the system voltage to a first predetermined level and a second predetermined level when the user device is in a low power, power-on state, and to control power to the charging unit based on the comparison;

a microcomputer to receive the system voltage and to control the supply of power to the comparator;

a single switch between the power supply and the charging unit; and user interface to receive a system voltage control command from a user when the device is in the low power, power-on state, wherein the microcomputer drives the comparator according to the system voltage control command, and wherein the comparator turns off power to the charging unit by opening the single switch when the system voltage is above the first predetermined level, and the comparator turns on power to the charging unit by closing the single switch when the system voltage is below the second predetermined level.

19. The electronic device of claim 18, wherein the comparator is a hysteresis comparator.

20. The electronic device according to claim 18, further comprising:

a regulator to receive the system voltage and to output a regulated voltage to drive the microcomputer and the comparator; and a second switch located between the regulator and the comparator, wherein the microcomputer determines whether the electronic device is in a low-power state and supplies power to the comparator by closing the second switch when the electronic device is in the low-power state and stops power to the comparator by opening the second switch when the electronic device is not in the low-power state.

21. The electronic device according to claim 18, further comprising a plurality of DC/DC converters to receive the system voltage and to supply power to a respective plurality of electronic components, wherein the microcomputer controls the operation of the plurality of DC/DC converters.

22. The electronic device according to claim 18, further comprising:

a battery connected to the charging unit; and a third switch located between the power supply and the battery, wherein the microcomputer controls a battery charging unit to charge the battery when a charge of the battery is below a predetermined level, the microcomputer closes the third switch to provide power from the battery to the charging unit when the electronic device does not receive power from the power supply, and the microcomputer opens the third switch to stop power from the battery to the charging unit when the electronic device receives power from the power supply.

23. A method of controlling an electronic device, wherein the electronic device comprises a single switch between a power supply unit and a charging unit, the method comprising:

generating a system voltage to power at least one electronic component of the electronic device by charging the charging unit with power from the power supply unit;

determining whether the electronic device is in a low power, power-on state;

receiving a system voltage control command from a user when the device is in the low power, power-on state;

comparing, according to the received system voltage control command, the system voltage to a first predetermined level and a second predetermined level when the user device is in the low power, power-on state;

controlling the supply of power from the power supply unit to the charging unit according to the results of the comparison by opening the single switch when the system voltage is higher than the first predetermined level, and by closing the single switch when the system voltage is less than the second predetermined level.

24. The method of claim 1, wherein comparing the system voltage with the first preset voltage and the second preset voltage comprises comparing the system voltage with the first preset voltage and the second preset voltage while the system voltage powers the at least one component of the user device.

25. The method of claim 7, wherein the system voltage powers the microcomputer.

* * * * *